United States Patent
Bisio et al.

(10) Patent No.: US 9,453,579 B2
(45) Date of Patent: Sep. 27, 2016

(54) SPHERICAL OBTURATOR FOR BALL VALVE AND BALL VALVE

(71) Applicant: F.I.P. Formatura Iniezione Polimeri S.p.A., Casella, Genoa (IT)

(72) Inventors: Andrea Bisio, Casella (IT); Corrado Mazzacano, Casella (IT)

(73) Assignee: F.I.P. Formatura Iniezione Polimeri S.p.A., Casella (IT)

( * ) Notice: Subject to any disclaimer, the term of this patent is extended or adjusted under 35 U.S.C. 154(b) by 145 days.

(21) Appl. No.: 14/259,710

(22) Filed: Apr. 23, 2014

(65) Prior Publication Data

US 2014/0319394 A1 Oct. 30, 2014

(30) Foreign Application Priority Data

Apr. 24, 2013 (EP) .................................... 13425060

(51) Int. Cl.
  *F16K 5/10* (2006.01)
  *F16K 5/20* (2006.01)
  *F16K 5/06* (2006.01)
  *F16K 5/12* (2006.01)

(52) U.S. Cl.
  CPC .............. *F16K 5/204* (2013.01); *F16K 5/0605* (2013.01); *F16K 5/10* (2013.01); *F16K 5/12* (2013.01)

(58) Field of Classification Search
  CPC ........ F16K 5/204; F16K 5/10; F16K 5/0605; F16K 5/12
  USPC ............ 251/208, 209, 315.16, 160, 120–122
  See application file for complete search history.

(56) References Cited

U.S. PATENT DOCUMENTS

| 5,435,521 | A | * | 7/1995 | Jarecki | F16K 5/0605 137/238 |
| 5,551,467 | A | * | 9/1996 | Booth et al. | F16K 5/0605 137/1 |
| 5,588,638 | A | * | 12/1996 | Bunting et al. | F16K 5/0605 251/315.05 |
| 6,021,812 | A | * | 2/2000 | Iwamoto et al. | F16K 5/0605 137/625.3 |
| 6,173,940 | B1 | * | 1/2001 | Kardohely et al. | F16K 5/0605 251/283 |
| 2008/0105845 | A1 | | 5/2008 | Yeary | |

FOREIGN PATENT DOCUMENTS

DE  199 40 471 A1  3/2001
DE  10 2007 025 516 A1  12/2008
EP  0 864 788 A1  9/1998

* cited by examiner

*Primary Examiner* — John K Fristoe, Jr.
*Assistant Examiner* — Andrew J Rost
(74) *Attorney, Agent, or Firm* — Blank Rome LLP

(57) ABSTRACT

Ball valve with a housing which forms an inlet, an outlet and an obturator seat, an obturator which forms an inner cavity with an inlet aperture, an outlet aperture opposite the inlet aperture, an auxiliary aperture between the inlet aperture and the outlet aperture, as well as a closed side opposite the auxiliary aperture. The inlet aperture and the outlet aperture connect the inlet with the inner cavity and with the obturator seat and an outer channel is formed in an outer surface of the closed side which, when the obturator is rotated from a closed position towards an open position, opens a first outer flow passage between the obturator seat and the outlet before the outlet aperture opens a second inner flow passage between the inner cavity and the outlet.

17 Claims, 6 Drawing Sheets

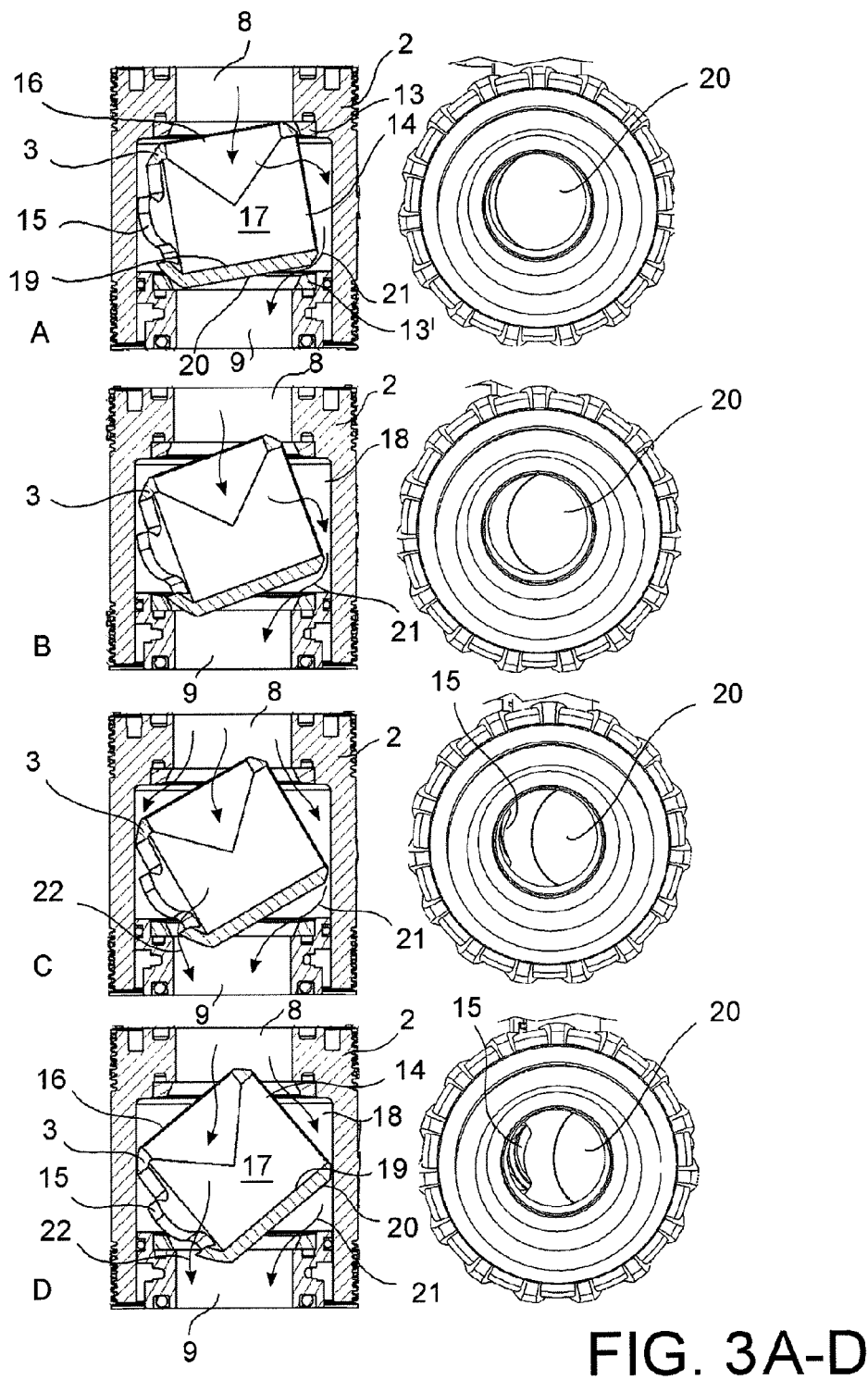
FIG. 3A-D

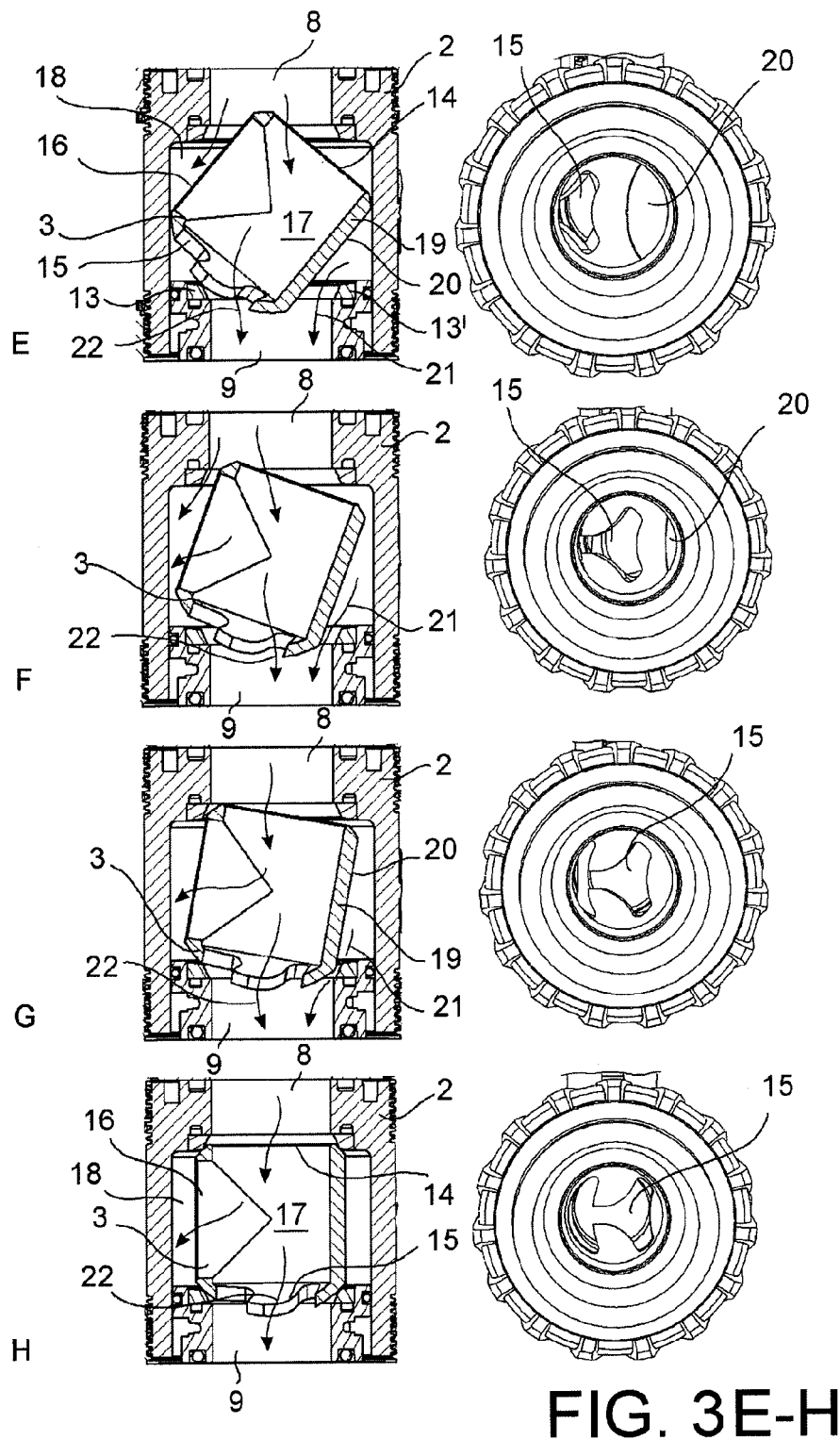
FIG. 3E-H

SPHERICAL OBTURATOR FOR BALL VALVE AND BALL VALVE

BACKGROUND OF THE INVENTION

1. Field of the Invention

The present invention relates to a spherical obturator for a ball valve and a ball valve for the controlled opening and closing of a fluid duct.

2. Description of the Related Art

So far it has been difficult to functionally achieve ball valves on the one hand with a linearisation of the rate of flow depending on the angle of rotation of the obturator to permit a gradual and controllable adjustment of the flow in the duct and on the other with a minimisation of the initial stroke of the obturator from the closed position (0°) to the angular position in which the passage of fluid commences. This second requirement is particularly felt for a fine adjustment of the flow which requires an angular adjustment stroke as large as possible, and to increase the speed of response of the valve to the adjustment, opening and closing commands.

DE102007025516 discloses a ball valve for the controlled opening and closing of a duct with:

- a housing having an inlet and an outlet suitable for being connected to corresponding portions of the duct,
  - a ball obturator housed in the housing in a rotatory manner around an adjustment axis and having an inner cavity with an inlet aperture and an outlet aperture suitable for being aligned with the inlet and outlet of the valve housing when the ball valve is open, as well as a third circular aperture between the inlet aperture and outlet aperture,
  - a control device suitable for being operated to rotate the obturator around the rotation axis, wherein the inlet aperture has a circular shape aperture and a central axis perpendicular to the adjustment axis, and the outlet aperture has an aperture (or transversal aperture cross-section) of a symmetrical shape to a plane orthogonal to the adjustment axis and parallel to the central axis and comprising a C-shaped rim section, two opposite sections of parallel rims connected to the ends of the C-section, two opposite, wedge-shaped inclined sections connected to the parallel sections, an arched section connected to the two inclined sections and projecting outwards from a parallel projection of the inlet aperture on the outlet aperture.

With this geometry of the ball obturator of the prior art, rapid opening and closing is achieved as well as an improved linearity of modulation (FIG. 7) compared to traditional ball valves (FIG. 6).

However the initial adjustment stroke with no flow is still considerable (around 15° . . . 20°) and the response of the obturator is still not sufficiently linear to permit rapid, controllable and intuitive (especially in the case of manual operation) adjustment, opening and closing of the valve.

SUMMARY OF THE INVENTION

The purpose of the present invention is therefore to make available a ball valve and an obturator for a ball valve having characteristics such as to overcome the drawbacks of the prior art.

One particular purpose of the invention is to propose a ball valve and an obturator for a ball valve having characteristics such as to reduce the initial stroke of the obturator from the closed position to the position in which the passage of fluid begins.

A further particular purpose of the invention is to propose a ball valve and an obturator for a ball valve having characteristics such as to increase the angular adjustment stroke of the flow and linearise the ratio between the adjustment angle of the obturator and the rate of flow (in constant pressure gradient Δp conditions).

At least some of these purposes are achieved by a ball valve for regulating the flow of a fluid in a duct, comprising a housing with an inlet, an outlet and an obturator seat, a ball obturator positioned inside the valve body by means of the interposition of sealing means which separate the inlet and the outlet from the obturator seat, actuation means to rotate the obturator around an adjustment axis between a closed position and a fully open position, wherein the obturator forms an inner cavity with an inlet aperture, an outlet aperture opposite the inlet aperture, an auxiliary aperture positioned between the inlet aperture and the outlet aperture, as well as a closed side opposite the auxiliary aperture, so that throughout the entire angular adjustment stroke the inlet aperture and the outlet aperture fluidically connect the inlet with the inner cavity of the obturator and with the obturator seat, wherein an outer channel is formed in an outer surface of the closed side which, when the obturator is rotated from the closed position towards the fully open position, forms a first outer flow passage between the obturator seat and the outlet before the outlet aperture forms a second inner flow passage between the inner cavity of the obturator and the outlet.

This permits a reduction of the angle of rotation of the obturator needed to open the valve regardless of the linearisation of the ratio between the adjustment angle of the obturator and the rate of flow. Consequently, the shape of the outlet aperture 15 can be optimised for the linearisation of the ratio between the adjustment angle of the obturator and the rate of flow without having to also ensure the initial passage of fluid.

Consequently, the invention better conciliates the two requirements to broaden the angular adjustment stroke and to linearise the ratio between the adjustment angle and the rate of flow of the valve.

BRIEF DESCRIPTION OF THE DRAWINGS

For a clearer comprehension of the invention and its advantages some embodiments thereof will be described below by way of a non-limiting example, with reference to the figures, wherein:

FIG. 1 shows a ball valve according to one embodiment in a fully open configuration (adjustment angle 90°), in a cross-section view according to a vertical cross-section plane defined by a central flow axis and a rotation axis of the obturator;

FIG. 2 shows the ball valve in FIG. 1 in a fully closed configuration (adjustment angle 0°), in a cross-section view according to a horizontal cross-section plane orthogonal to the rotation and which comprises the central flow axis;

FIGS. 3*a* to 3*h* illustrate a adjustment sequence (of 10°, 20°, 30°, 40°, 50°, 70°, 80°, 90°) of the valve in cross-section according to FIG. 2 and, beside it, a corresponding view of the obturator, from a tubular outlet portion of the valve;

FIGS. 4*a* to 4*i* and 4*k* are views of an obturator for ball valves according to one embodiment;

FIGS. 5*a* to 5*i* and 5*k* are views of an obturator for ball valves according to a further embodiment;

FIGS. 6 and 7 show adjustment curves for known ball valves subject to a constant pressure gradient Δp, in which the y-axis indicates the rate of flow (l/min) and the x-axis indicates the adjustment angle (°) of the ball obturator.

Figure 1:
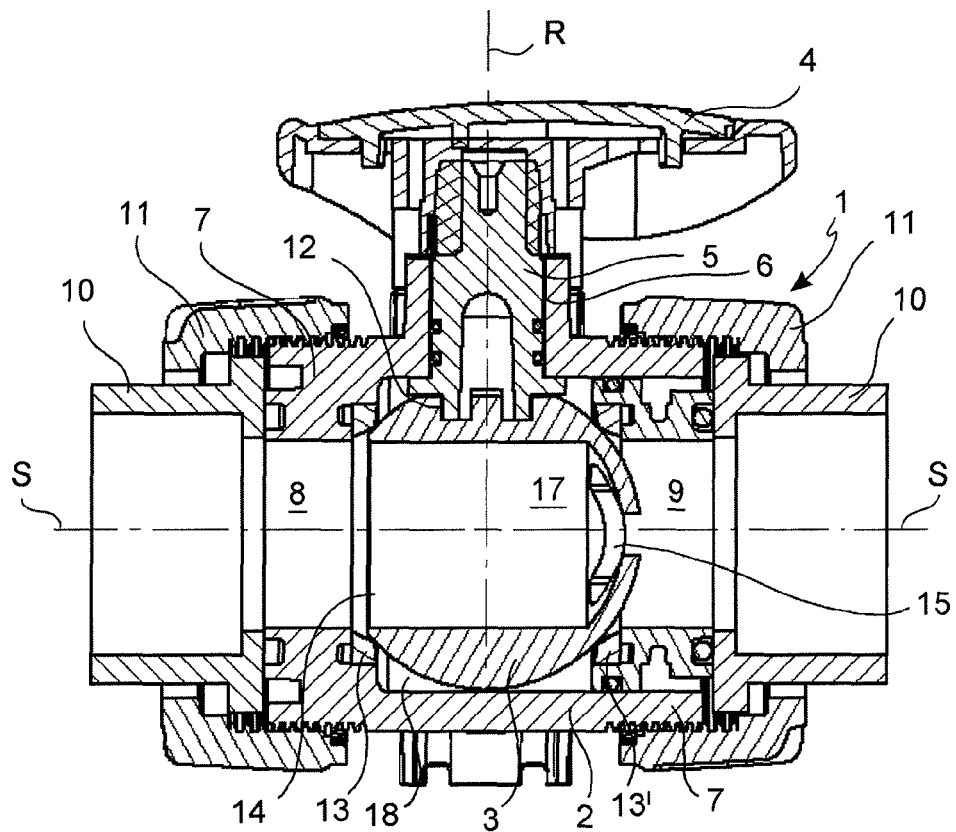
Figure 8:
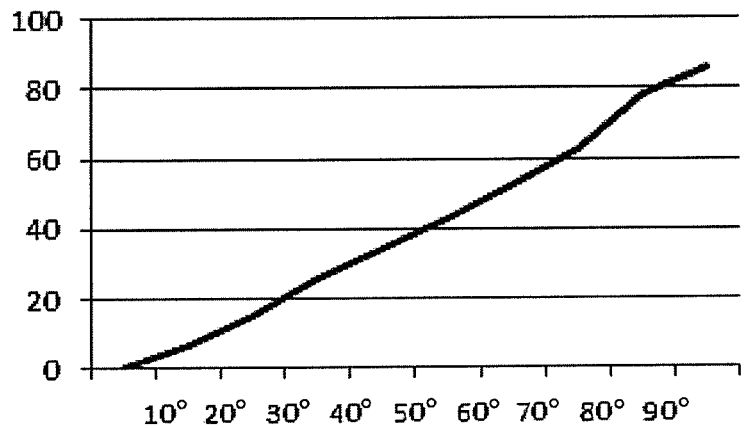

FIG. 8 shows a adjustment curve of the valve in FIG. 1, subject to a constant pressure gradient Δp, in which the y-axis indicates the rate of flow (l/min) and the x-axis indicates the adjustment angle (°) of the ball obturator.

DETAILED DESCRIPTION OF THE PREFERRED EMBODIMENTS

With reference to the figures, a ball valve for opening, closing and regulating the flow of a fluid in a duct, is globally denoted by reference numeral 1. The valve 1 comprises a valve body or housing 2, an obturator 3 (of the ball type but not having a perfectly spherical shape) positioned inside the valve body 2, a control handle 4 or non-manual rotary actuator, for example electric, suitable for connecting to the housing 2 and rotating the obturator 3 around an adjustment axis R (which forms a rotation axis thereof), by means of a drive shaft 5 positioned in a specific passage 6 of the housing 2. Depending on its angular adjustment position, the obturator 3 influences (e.g. regulates, blocks, opens) a flow of fluid, for example of a liquid, through the valve 1.

The housing 2 forms two tubular connection portions 7 respectively defining an inlet 8 and an outlet 9 for the flow to be controlled. The connection portions 7 are detachably connected to corresponding connection ends 10 of sections of a duct. The connection portions 7 of the valve 1 and the connection ends 10 of the duct can be connected to each other by means of ring nuts 11, coupling to one and screwing to another of the connection portions 7 and the connection ends 10.

The obturator 3 is housed in the housing 2 by means of interposed sealing means, in particular, rims or sealing rings 13 (preferably circular) which separate an obturator seat 18 of the housing 2 from the inlet 8 and from the outlet 9.

The obturator 3 has a control seat 12 on its upper side for an integral coupling in rotation with the drive shaft 5 for the transmission of the rotation around the rotation axis R from the control handle 4 to the obturator 3.

The ball obturator 3 forms an inlet aperture 14, an outlet aperture 15 substantially opposite the inlet aperture 14, and an auxiliary aperture 16 positioned between the inlet aperture 14 and the outlet aperture 15 seen in an opening direction of rotation of the obturator 3. The three apertures 14, 15, 16 open into an inner cavity 17 of the obturator 3.

With the valve 1 open (FIG. 1, 3h, rotation angle of the obturator 3=90°) the inlet aperture 14 is facing towards and in communication with the inlet 8 and the outlet aperture 15 is facing towards and in communication with the outlet 9 of the housing 2 and the flow crosses the valve in the direction of flow inlet 8→obturator 3→outlet 9. In this condition the auxiliary aperture 16 is directed transversally to the direction of flow and positioned inside the obturator seat 18 (delimited by two sealing rings 13) and places the obturator seat 18 (or in other words: the interstice between the housing 2 and the obturator 3 between the two sealing rings 13) in communication with the inner cavity 17 of the obturator 3.

Figure 2:
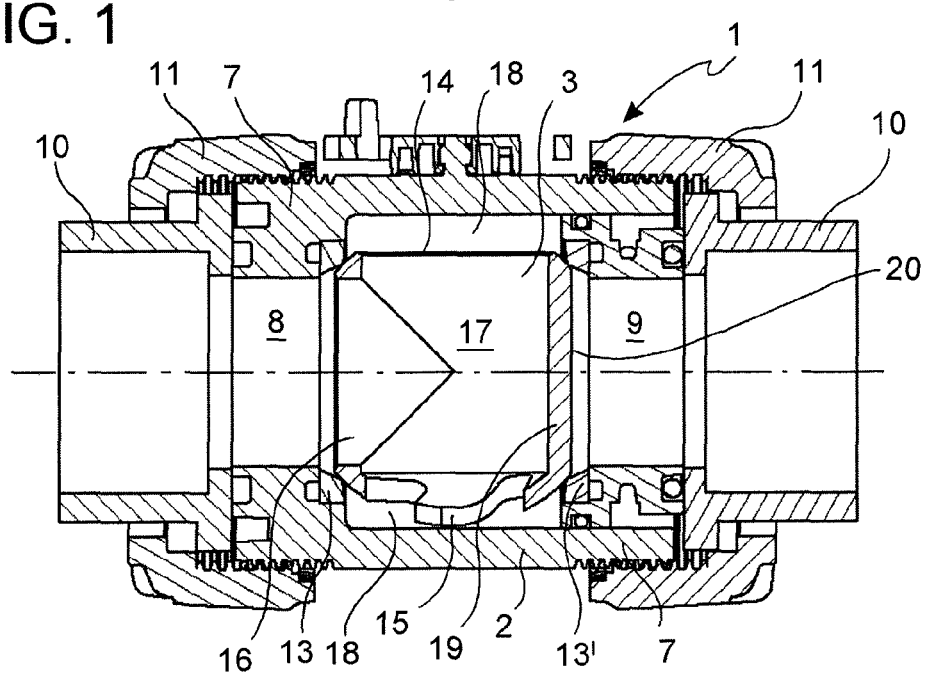

With the valve 1 closed (FIG. 2, rotation angle of the obturator 3=0°) the inlet 14 and outlet 15 apertures are directed transversally to the direction of flow and positioned inside the obturator seat 18 (delimited by the two sealing rings 13) and place the obturator seat 18 (or in other words: the interstice between the housing 2 and the obturator 3 between the two sealing rings 13) in communication with the inner cavity 17 of the obturator 3. The auxiliary aperture 16 is facing towards and in communication with the inlet 8, but a closed side 19 of the obturator 3 substantially opposite the auxiliary aperture 16, is facing towards the outlet 9 and in contact with the corresponding sealing rim or sealing ring 13 so as to isolate the outlet 9 both from the inner cavity 17 of the obturator 3 and from the obturator seat 18. In this condition the pressure difference between the inlet 8 and outlet 9 presses the closed side 19 of the obturator 3 actively against the sealing ring 13' on the side of the outlet 9 to ensure a reliable seal.

The three apertures 14, 15, 16 can be aligned with each other by means of a common plane of symmetry S, orthogonal to the rotation axis R of the obturator 3.

The central axes of the three apertures 14, 15, 16 may intersect the rotation axis R, for example in a point of intersection of the rotation axis R with the plane of symmetry S.

While the inlet apertures 14 and 15 are diametrically opposite and their central axes are parallel or identical, the central axis of the auxiliary aperture 16 is directed about 90° with respect to the central axes of the inlet 14 and outlet apertures 15.

Expressed in more general terms the inlet aperture 14, the auxiliary aperture 16, the outlet aperture 15 and the closed side 19 of the obturator 3 are formed in four corresponding spherical lunes (or biangles) of the obturator 3 positioned in succession in the opening direction of rotation around the rotation axis R, where a spherical lune is the part of spherical surface defined by two diametrical half-planes intersecting in the adjustment axis R. Ideally, the angle of aperture of each spherical lune is 90°.

According to one aspect of the invention, the obturator 3 comprises an outer channel 20 formed in an outer surface of the closed side 19, and which, when the obturator 3 is rotated from the closed position (FIG. 2, α=0°) towards the open position, places the obturator seat 18 in communication with the outlet 9 before the outlet aperture 15 places the inner cavity 17 of the obturator 3 in communication with the outlet 9.

This permits a reduction of the angle of rotation of the obturator needed to open the valve regardless of the linearisation of the ratio between the adjustment angle of the obturator and the rate of flow. Consequently, the shape of the outlet aperture 15 can be optimised for the linearisation of the ratio between the adjustment angle of the obturator and the rate of flow without having to also ensure the initial passage of fluid.

This permits an improved conciliation of the two requirements to broaden the angular adjustment stroke and to linearise the ratio between the adjustment angle and the rate of flow of the valve.

As may be seen in the sequence of FIGS. 2, 3a-3h, by rotating the obturator 3 from the closed position (FIG. 2) towards the fully open position (FIG. 3h), at a adjustment angle of approximately α=5°, at the outer channel 20 the obturator 3 detaches itself from the sealing ring 13' on the outlet side 9 and the outer channel 20 opens a first outer flow 21 through the obturator seat 18 and along the outer surface of the obturator 3. Subsequently, at a adjustment angle of approximately α=25°, at the outlet aperture 15 the obturator 3 detaches itself from the sealing ring 13' on the outlet side 9 and the outlet aperture 15 opens a second inner flow 22 through the inner cavity of the obturator 3.

According to one embodiment, with the valve closed (adjustment angle of α=0°) a minimum circumferential distance measured on the outer surface of the obturator 3 (in the opening direction of rotation) between the outer channel 20 and the sealing rim or sealing ring 13' on the outlet side 9, is less than a minimum circumferential distance (in the opening direction of rotation) between the outlet aperture 15 and the sealing rim or sealing ring 13' on the outlet side 9.

According to a further embodiment, a minimum circumferential distance measured on the outer surface of the obturator 3 (in the opening direction of rotation) between the outer channel 20 and the inlet aperture 14, is less than a minimum circumferential distance (in the opening direction of rotation) between the outlet aperture 15 and the outer channel 20.

According to one embodiment, the outer channel 20 has a flat shape, preferably circular and advantageously perpendicular to the inlet aperture 14 and parallel to the auxiliary aperture 16.

This simplifies the geometry of the obturator 3, making it lighter and facilitating its manufacture by means of injection moulding, but also by means of mechanical machining of a semi-finished piece cut from a. for example cylindrical, bar, as well as reducing the dimensional tolerance.

Alternatively, the outer channel 20 may have a shape which is concave in transversal cross-section, for example a cavity or groove made in the outer surface of the closed side 19 of the obturator 3.

According to a further aspect of the invention, with the valve completely open (adjustment angle of α=90°) the outer channel 20 is positioned completely inside the obturator seat 18 and isolated from the outlet 9 by means of the sealing rim or sealing ring 13' on the outlet side 9.

This way, with the valve 1 fully open, no bifurcation and subsequent reunification of flows occurs and the flow resistance and pressure drop are reduced.

In one embodiment, the outer channel 20 or system of outer channels 20 has a circumferential extension (in particular along a circumference of the obturator in the plane of symmetry S) corresponding to an angular adjustment stroke of 70° to 85°, preferably 80° to 85°. The outlet aperture 15 has a circumferential extension (in particular along a circumference of the obturator in the plane of symmetry S) corresponding to an angular adjustment stroke of 55° to 70°, preferably 65° to 70°. This ensures the contemporary presence of the outer flow 21 and the inner flow 22 in a broad adjustment range and facilitates the linearisation of the ratio between the rate of flow and the adjustment angle, thanks to the possibility of varying the shapes of two passage cross-sections.

According to one embodiment, the flow cross-section of the outer channel 20 widens continuously from a first end 23 facing towards the inlet aperture 14 up to an intermediate cross-section, preferably central, and narrows continuously from the intermediate cross-section up to its second end 24 facing towards the outlet aperture 15. The direction along which the aforesaid variation of cross-section takes place is the circumferential direction around the rotation axis R.

In the opposite direction, the outlet aperture 15 has a first widened portion 25 facing towards the closed side 19, a second widened portion 27 facing towards the auxiliary aperture 16 and an intermediate narrower portion 26 between the first widened portion 25 and the second widened portion 27. This way the rate of the outer flow 21 and the rate of the inner flow 22 vary in opposite directions depending on the adjustment angle of the obturator 3, obviating a disproportionate variation of the rate of flow with respect to the variation of the adjustment angle.

According to one embodiment (FIG. 4e), the first widened portion 25 of the outlet aperture 15 has a convex front rim 28 with a curvature similar or substantially identical to the curvature of the sealing ring 13' on the outlet side 9. Two opposite side rims 29 are connected to the opposite ends of the front rim 28 which, approaching the first widened portion 27, determine firstly an approximative linear widening of the first portion 25, then an approximate linear narrowing and lastly a further curved concave narrowing, up to the narrowed portion 26. The second widened portion 27 of the outlet aperture 15 has a convex rear rim 30 with a curvature radius identical or inferior to that of the front rim 28 and the second widened portion 27 has a substantially C-shape which connects to the narrowed portion 26. The entire outlet aperture 15 may be advantageously symmetrical to a plane of symmetry S perpendicular to the rotation axis R.

In other words, the narrowed portion 26 of the outlet aperture is formed of two opposite protuberances 31, projecting into the outlet aperture 15 and inclined towards its second widened portion 25.

Figure 5:
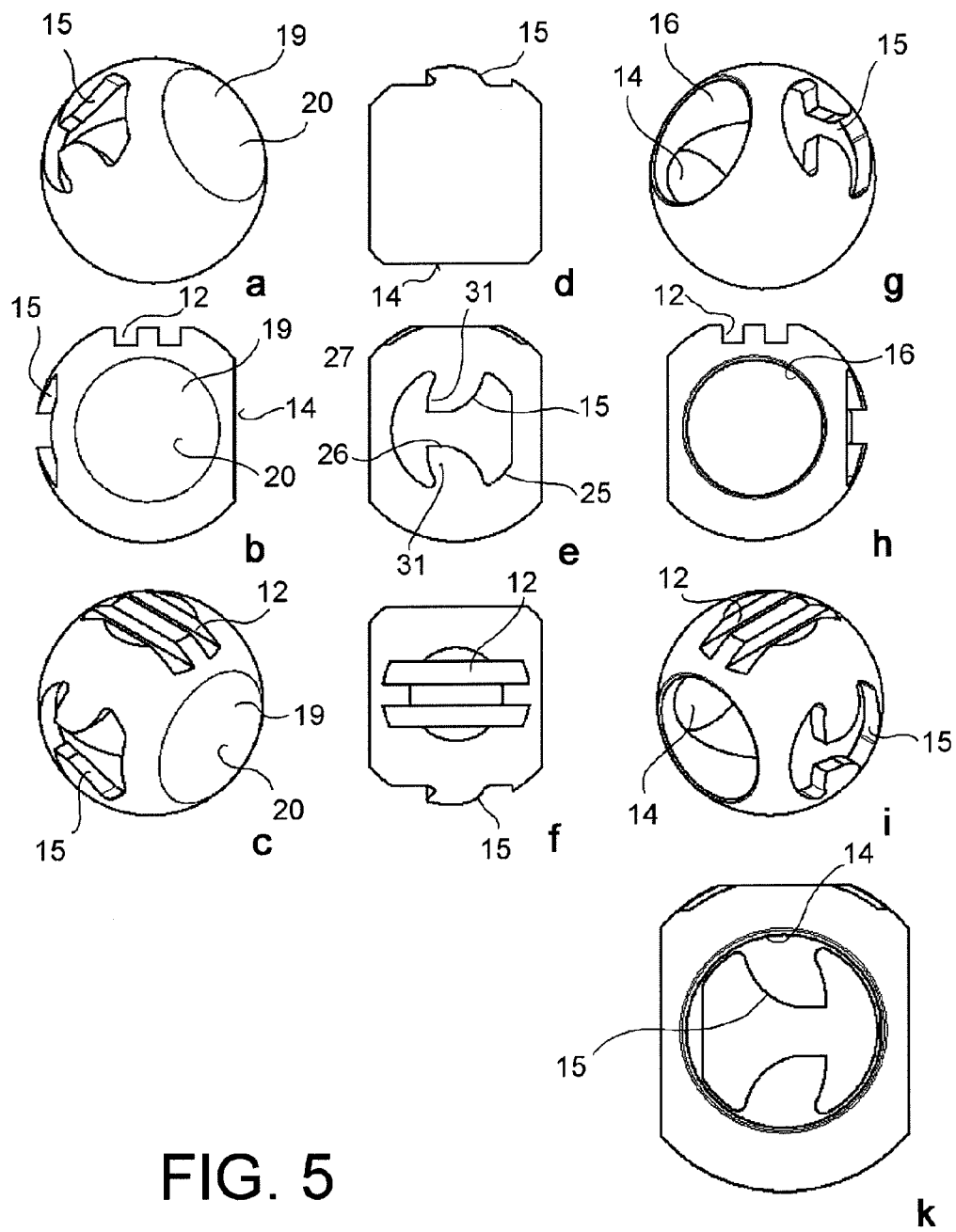
Figure 6:
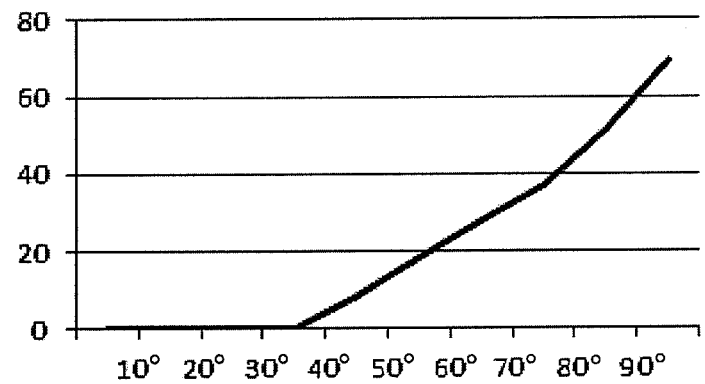
Figure 7:
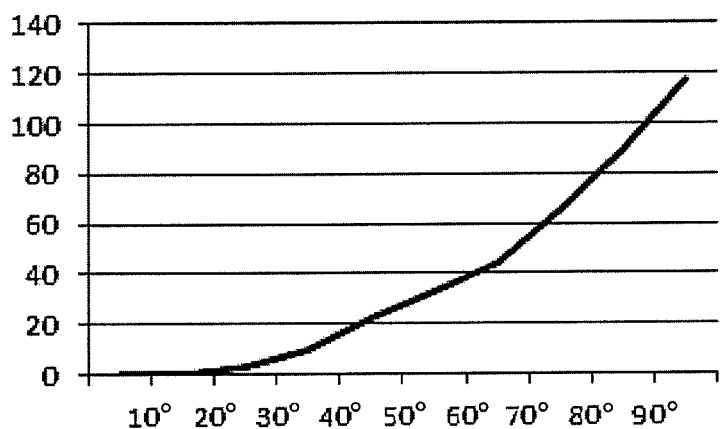

In the embodiment shown in FIG. 5e, the narrowed portion 26 of the outlet aperture is formed of two opposite protuberances 31, projecting into the outlet aperture 15 and inclined towards its second widened portion 25, wherein both a front side of the protuberances 31 facing towards the first portion 25 and a rear side of the protuberances 31 facing towards the second portion 27 is convex.

The auxiliary aperture 16 may have a circular shape of a substantially identical dimension to the inlet aperture 8, also generally circular.

According to one embodiment (FIG. 5k), in a parallel projection along its central axis, the contour of the outlet aperture 15 does not go beyond the contour of the inlet aperture 14, but rims of the widened portions 25, 26 of the outlet aperture 15 may extend beyond the circular rim of the inlet aperture 14. Such shape facilitates the manufacturing and in particular the mechanical machining of the obturator.

Figure 4:
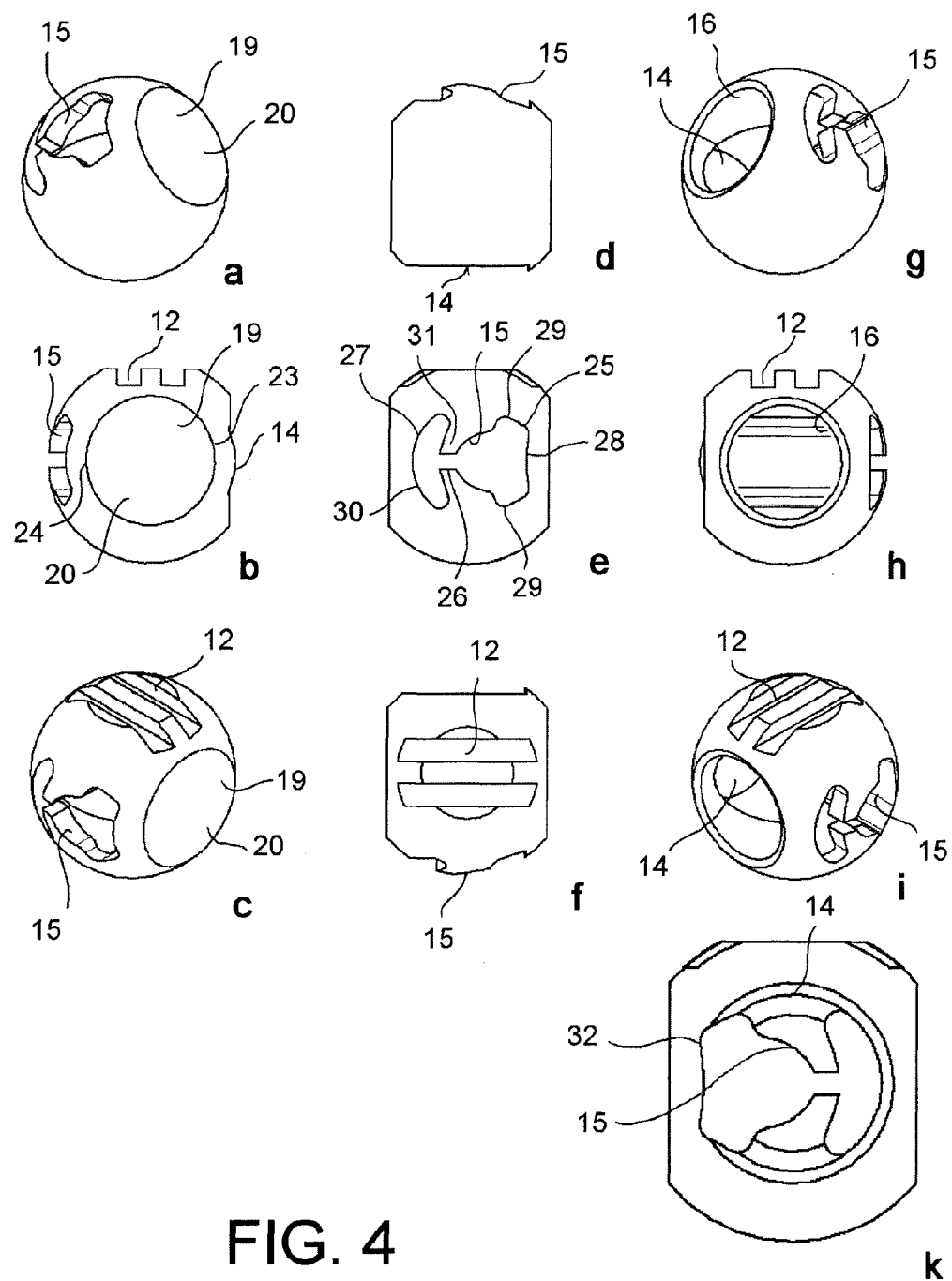

In the embodiment shown in FIG. 4k, in a parallel projection along its central axis, the contour of the outlet aperture 15 has at least one portion which goes beyond the circular perimeter of the inlet aperture 14, and the inlet aperture 14 has locally widened areas 32 with respect to its circular perimeter, wherein these zones 32 have an identical shape and position to the portion going beyond the inlet aperture 14.

This reduces the flow resistance and facilitates the manufacturing of the obturator 3 by means of injection moulding.

The components of the valve 1 may be manufactured from plastic material or alternatively from metal or solid, waterproof materials in general. The sealing rings may be made from rubber or known sealing polymers.

Obviously, a person skilled in the art may make further modifications and variations to the obturator 3 and ball valve 1 according to the present invention so as to satisfy contingent and specific requirements, while remaining within the sphere of protection of the invention as defined by the following claims.

What is claimed is:

1. Ball valve for regulating the flow of a fluid in a duct, comprising a housing with an inlet, an outlet and an obturator seat, a ball obturator positioned inside the valve body by means of the interposition of sealing means which separate the inlet and the outlet from the obturator seat, actuation means for rotating the obturator around an adjustment axis between a closed position and a fully open position, wherein the obturator forms an inner cavity with an inlet aperture, an outlet aperture opposite the inlet aperture, an auxiliary aperture between the inlet aperture and the outlet aperture, as well as a closed side opposite the auxiliary aperture, so that throughout the entire angular adjustment stroke the inlet aperture and the outlet aperture fluidically connect the inlet with the inner cavity of the obturator and with the obturator seat, wherein an outer channel is formed in an outer surface of the closed side which, when the obturator is rotated from the closed position towards the fully open position, forms a first outer flow passage between the obturator seat and the outlet before the outlet aperture forms a second inner flow passage between the inner cavity of the obturator and the outlet.

2. Ball valve according to claim 1, wherein:

in the fully open position, the inlet aperture is facing towards and flows directly into the inlet and the outlet aperture is facing towards and flows directly into the outlet and the auxiliary aperture is positioned in the obturator seat and places the obturator seat in communication with the inner cavity of the obturator, in the closed position, the inlet and outlet apertures are positioned inside the obturator seat and place the obturator seat in communication with the inner cavity of the obturator, the auxiliary aperture is facing towards and opens directly into the inlet and the closed side is facing towards the outlet and sealingly contacting the sealing means so as to isolate the outlet from the obturator seat and from the inner cavity, the first outer flow passage is delimited by sealing means and by the outer channel, and the second inner flow passage is delimited by the outlet aperture which flows directly into the outlet, and at least in an initial adjustment stroke, by the sealing means.

3. Ball valve according to claim 1, wherein the sealing means comprise a sealing ring positioned between the obturator seat and the outlet.

4. Ball valve according to claim 3, wherein in the closed position, a minimum circumferential distance between the outer channel and the sealing ring measured on the outer surface and in the direction of rotation of the obturator, is less than a minimum circumferential distance between the outlet aperture and the sealing ring.

5. Ball valve according to claim 1, wherein a minimum circumferential distance between the outer channel and the inlet aperture measured on the outer surface and in the direction of rotation of the obturator, is less than a minimum circumferential distance between the outlet aperture and the outer channel.

6. Ball valve according to claim 1, wherein the outer channel has a flat shape.

7. Ball valve according to claim 6, wherein the outer channel is circular, perpendicular to the inlet aperture and parallel to the auxiliary aperture.

8. Ball valve according to claim 1, wherein in the fully open position, the outer channel is positioned completely inside the obturator seat and isolated from the outlet by means of the sealing means.

9. Ball valve according to claim 1, wherein the outer channel has a circumferential extension with respect to the adjustment axis corresponding to an angular adjustment stroke of 70° to 85°.

10. Ball valve according to claim 1, wherein the outlet aperture has a circumferential extension with respect to the adjustment axis corresponding to an angular adjustment stroke of 55° to 70°.

11. Ball valve according to claim 1, wherein along a circumferential direction to the adjustment axis the outer channel widens continuously from a first end facing towards the inlet aperture up to an intermediate cross-section, and narrows continuously from the intermediate cross-section until its second end facing towards the outlet aperture and wherein the outlet aperture has a first widened portion facing towards the closed side, a second widened portion facing towards the auxiliary aperture and an intermediate narrowing formed between the first widened portion and the second widened portion.

12. Ball valve according to claim 11, wherein in a parallel projection along a central axis of the outlet aperture, the contour of the outlet aperture does not go beyond the contour of the inlet aperture, and rims of the widened portions of the outlet aperture extend along the mainly circular rim of the inlet aperture.

13. Ball valve according to claim 1, wherein the inlet aperture, the outlet aperture, the auxiliary aperture and the outer channel are all a symmetrical shape with respect to a common plane of symmetry, orthogonal to the adjustment axis.

14. Ball valve according to claim 1, wherein the inlet aperture, the auxiliary aperture, the outlet aperture and the outer channel are formed in four different spherical lunes of the obturator defined between perpendicular diametrical half-planes intersecting in the adjustment axis.

15. Ball valve according to claim 1, wherein the obturator is made from plastic by injection molding.

16. Ball valve according to claim 1, wherein the outer channel has a circumferential extension with respect to the adjustment axis corresponding to an angular adjustment stroke of 80° to 85°.

17. Ball valve according to claim 1, wherein the outlet aperture has a circumferential extension with respect to the adjustment axis corresponding to an angular adjustment stroke of 65° to 70°.

* * * * *